(12) United States Patent
Lawther et al.

(10) Patent No.: US 8,311,741 B1
(45) Date of Patent: Nov. 13, 2012

(54) METHOD AND SYSTEM FOR GENERATING TRAVEL ROUTES BASED ON WIRELESS COVERAGE

(75) Inventors: Michael Jan Lawther, West Ryde (AU); Luke David Macpherson, Leichhardt (AU); Andrew Foster, Naremburn (AU)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/289,299

(22) Filed: Nov. 4, 2011

(51) Int. Cl.
*H04B 10/00* (2006.01)
(52) U.S. Cl. .......................................... 701/527; 340/989
(58) Field of Classification Search .................. 701/527; 455/423, 446, 67.1, 447, 67.16, 404.1, 456.1–456.3, 455/457; 340/989, 988, 990, 995.1; 370/338
See application file for complete search history.

(56) References Cited

U.S. PATENT DOCUMENTS

| | | | |
|---|---|---|---|
| 6,631,267 B1 * | 10/2003 | Clarkson et al. | 455/446 |
| 6,871,139 B2 * | 3/2005 | Liu et al. | 701/410 |
| 7,079,945 B1 * | 7/2006 | Kaplan | 701/451 |
| 7,243,134 B2 * | 7/2007 | Bruner et al. | 709/216 |
| 7,392,017 B2 | 6/2008 | Chu et al. | |
| 7,908,080 B2 | 3/2011 | Rowley et al. | |
| 2007/0211676 A1 | 9/2007 | Sharma et al. | |
| 2009/0023456 A1 | 1/2009 | Seacat et al. | |
| 2009/0276150 A1 | 11/2009 | Vorlander | |
| 2010/0036604 A1 | 2/2010 | O'Connell et al. | |
| 2010/0125411 A1 | 5/2010 | Goel | |
| 2011/0112759 A1 | 5/2011 | Bast et al. | |

* cited by examiner

*Primary Examiner* — Dalena Tran
(74) *Attorney, Agent, or Firm* — Dority & Manning, P.A.

(57) ABSTRACT

Methods and systems for providing routing information to a user are disclosed. Based on a request for routing information between an origin and destination for a travel objective, wireless coverage data for the geographic area associated with the travel objective is received. A graph model for determining routes between the origin and destination is adjusted based at least in part on the wireless coverage data. According to particular aspects of the present disclosure, the graph model can be adjusted based on the wireless coverage data and at least additional parameter such as estimated trip time, average speed, distance, favored routes or traffic information. User information can be optionally provided and used to emphasize or deemphasize wireless coverage data in the determination of the route for the travel objective.

28 Claims, 7 Drawing Sheets

METHOD AND SYSTEM FOR GENERATING TRAVEL ROUTES BASED ON WIRELESS COVERAGE

FIELD

The present disclosure relates generally to assisting travelers with travel planning, and more particularly to providing a suggested route that takes into consideration wireless coverage along the travel route.

BACKGROUND

Computer-based mapping systems have been developed for facilitating travel planning. For example, travel-planning Internet websites are commercially available and well-known. Such websites typically permit a user to input an origin and a destination for travel, and these are then used to calculate and provide travel directions to the user.

Computer-based mapping systems have been used to provide travel directions to mobile devices. For example, Google Maps for Mobile allows mobile devices, such as smart phones, tablets, and PDAs, to display maps and directions in response to user requests. Some systems, including Google Maps for Mobile, also allow users to display their progress relative to a map in real time. For example, if a mobile device is able to determine its geographic location, the mobile device can download or otherwise access maps corresponding with the device's location and then can display its location on the map.

As the number of features associated with wireless mobile devices has increased, it has become increasingly desirable to have wireless access through one or more wireless networks as the user of the mobile device travels from an origin to a destination. For instance, a user may need wireless access during travel to make telephone calls, to receive email and/or text messages, to receive navigation information or travel directions, and/or to receive traffic information, weather information, or other information. Thus, it would be desirable to provide travel directions to a user that provides enhanced wireless access during travel from an origin to a destination and that provides a reduced number of call/data drop outs along the travel route.

SUMMARY

Aspects and advantages of the invention will be set forth in part in the following description, or may be obvious from the description, or may be learned through practice of the invention.

One exemplary aspect of the present disclosure is directed to a computer-implemented method of providing route information. The method includes receiving an origin and a destination for a travel objective; accessing a graph model associated with a geographic region proximate the travel objective; obtaining wireless coverage data associated with the geographic region; adjusting the graph model based at least in part on the wireless coverage data; determining a route between the origin and destination from the graph model; and providing the route for presentation to a user.

Other exemplary implementations of the present disclosure are directed to systems, apparatus, computer-readable media, devices, and methods for providing travel routes based at least in part on wireless coverage data.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present disclosure is generally related to assistance with planning routes for travel, such as by automobile, mass transit, pedestrian, or other mode of travel. Based on origin and destination information input by a user, suggested routes can be generated that provide for increased wireless coverage along the travel route so that a traveler can expect reduced periods of limited wireless connectivity or dropped wireless coverage during travel. The routes can be provided to the user with personal computers, navigation systems, and/or mobile devices such as smart phones, PDAs, or tablets.

According to aspects of the present disclosure, wireless coverage data for the geographic area associated with a travel objective is received. The wireless coverage data can be received, for instance, from a wireless access provider, from a database of collected wireless coverage data, or from a user's mobile device. Exemplary wireless coverage data can include, for example, signal quality data, the length of travel time along a particular traversable path that a traveler could expect to be without wireless coverage, the number of instances of dropped calls/coverage along a particular route, or other suitable data. A route is generated based on the wireless coverage data such that the suggested route provides increased wireless coverage along the travel route.

For instance, the wireless coverage data can be used to adjust a graph model associated with the travel objective to take into account the wireless coverage data along the various possible travel routes. The graph model can have a plurality of nodes representing physical locations, such as a starting node and a destination node, and a plurality of edges representing traversable paths between the nodes in the graph model. Each of the plurality of edges can be assigned a weighting factor that is used in the determination of a route from the starting node to the destination node. For instance, a shortest path algorithm can be used to determine a path between the starting node and destination node that reduces the sum of the weighting factors assigned to the edges in the path between the starting node and the origin node.

According to exemplary aspects of the present disclosure, the weighting factors assigned to the plurality of edges in the graph model can be adjusted to reflect the wireless coverage data. For instance, if a particular edge in the graph model represents a traversable path with little to no wireless coverage, the weighting factor assigned to the edge associated with that particular path can be increased to disfavor the selection of that particular path during determination of the route from the origin to the destination. In this manner, the subject matter of the present disclosure can determine optimal routes for a travel objective based at least in part on wireless coverage data associated with the geographic area proximate the travel objective. Once the route has been determined, the route can be provided to the user for assistance in navigation.

According to particular aspects of the present disclosure, the weighting factors assigned to the plurality of edges can be adjusted based on the wireless coverage data and at least one travel parameter associated with the plurality of edges, such as estimated trip time, average speed, distance, or traffic information. In this manner, the subject matter of the present disclosure can provide a route planning tool that not only takes into account wireless coverage, but also other travel parameters, such as shortest path, quickest travel time, and reduced traffic.

The weighting factors assigned to the plurality of edges can also be adjusted based on information associated with the user, such as information concerning preferred routes, historical routes taken by the user, and calendar information associated with the user. For example, if calendar information associated with the user, such as a telephone call appointment scheduled in the user's calendar, indicates that the user will need wireless access during travel, the weighting factors assigned to the plurality of edges can be adjusted to emphasize wireless connectivity over, for instance, travel time, in determining an optimum route between the origin and destination.

As another example, if calendar information associated with the user indicates that the user has to be at a certain location by a particular time for an appointment, the weighting factors assigned to the particular edges can be adjusted to emphasize travel time or shortest distance over wireless connectivity. In this manner, the subject matter of the present disclosure can provide an enhanced route planning tool that can be used to tailor route information to specific users while increasing wireless access for the user during travel.

Figure 1:
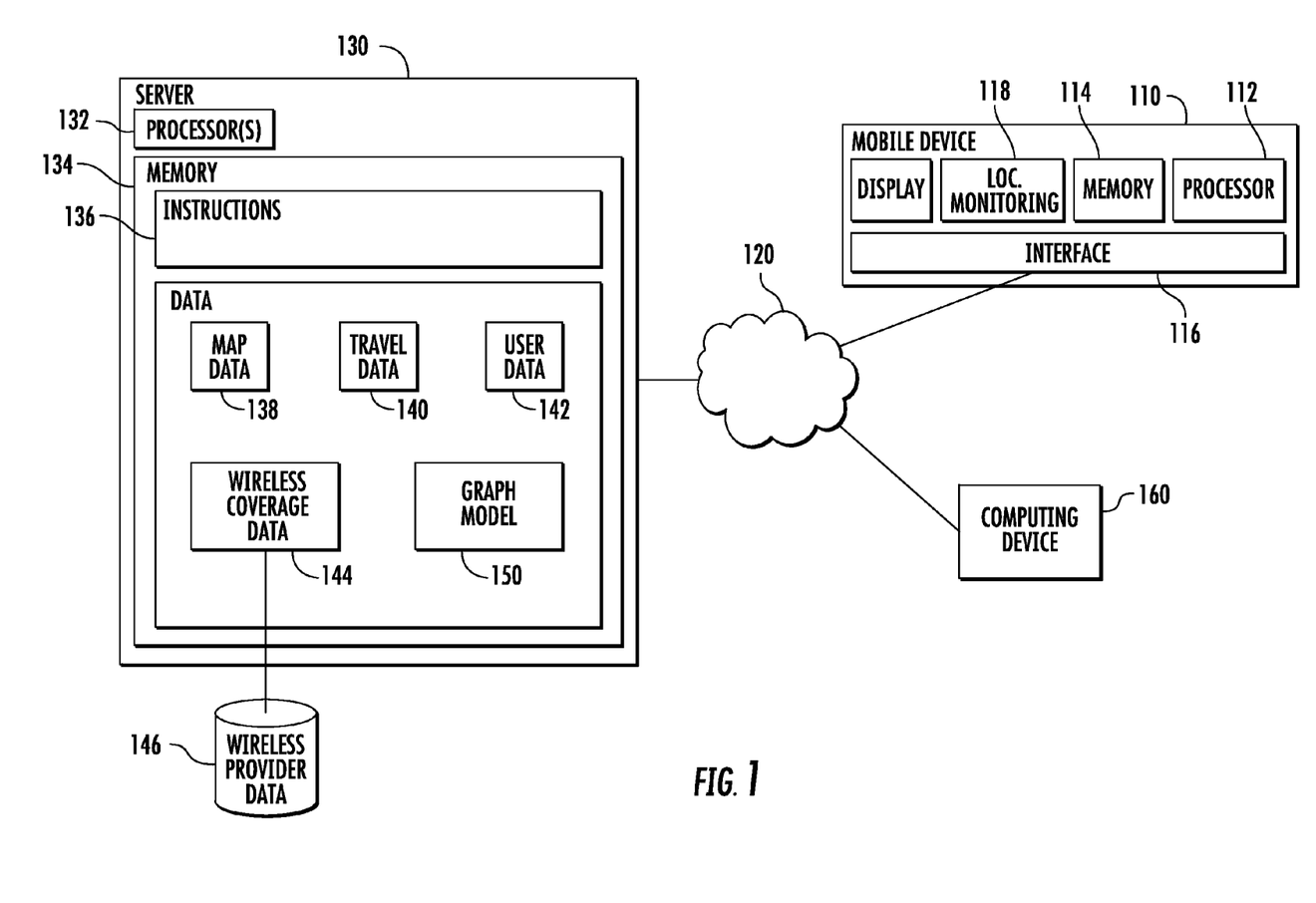
FIG. 1 depicts a block diagram of an exemplary system for providing route information according to an exemplary embodiment of the present disclosure.
Figure 2:
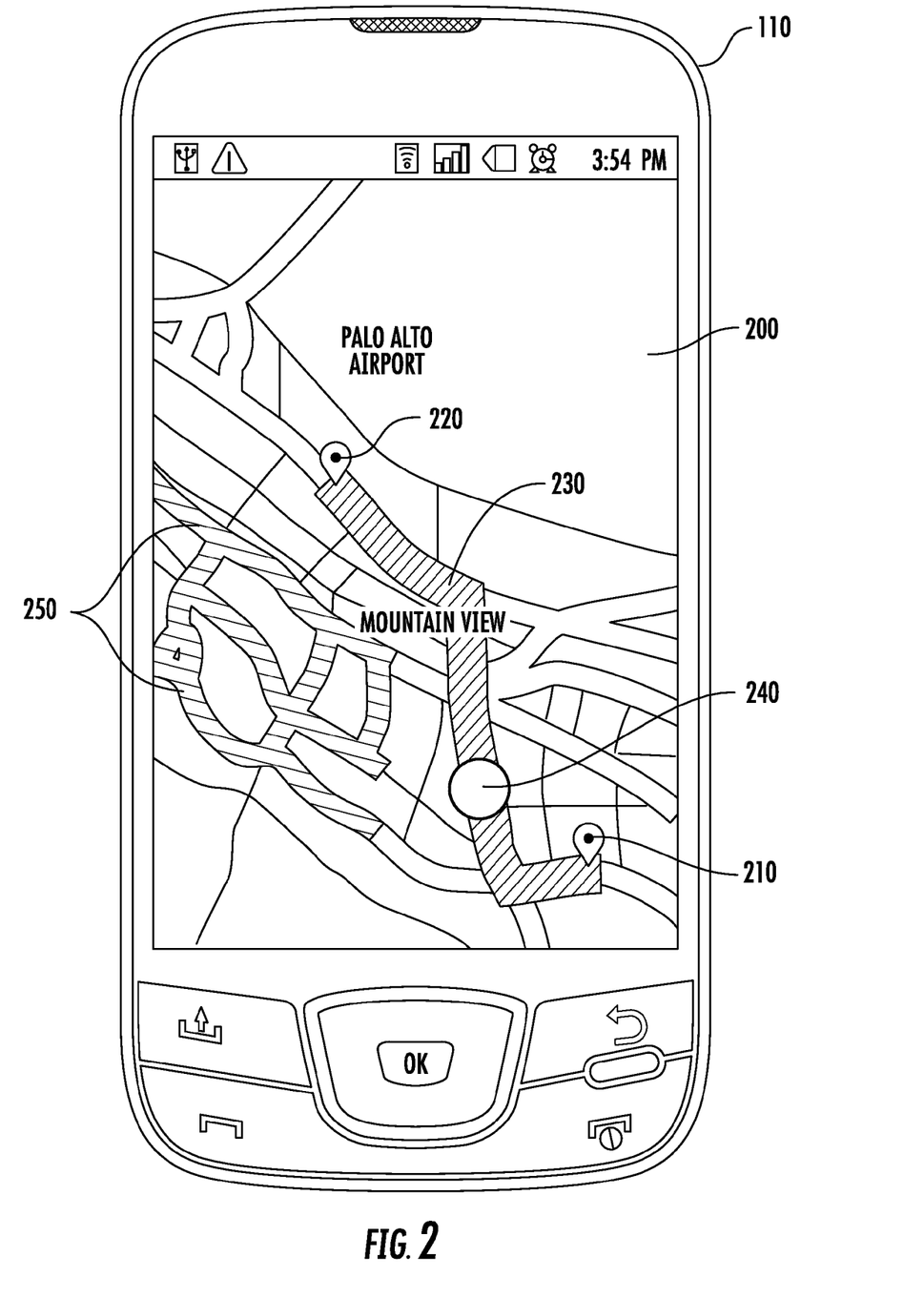
FIG. 2 depicts an exemplary mobile computing device displaying route information according to an exemplary embodiment of the present disclosure.

FIG. 1 illustrates an exemplary system 100 for providing route information according to an exemplary embodiment of the present disclosure. As illustrated, system 100 includes a computing device 110, shown as a mobile smartphone, for providing route information to a user. The computing device 110 device can take any appropriate form, such as a personal computer, smartphone, desktop, laptop, PDA, tablet, or other computing device. The computing device 110 includes appropriate input and output devices, such as a display screen, touch screen, touch pad, data entry keys, speakers, and/or a microphone suitable for voice recognition. A user can request travel directions by inputting origin and destination information into computing device 110. The computing device 110 can then receive routing information based on the origin and destination information and provide routing information to the user through any suitable output device, such as a display screen 115. FIG. 2 depicts an exemplary mobile computing device 110 displaying exemplary routing information through interface 200.

Referring back to FIG. 1, the computing device 110 includes a processor(s) 112 and a memory 114. The processor(s) 112 can be any known processing device. Memory 114 can include any suitable computer-readable medium or media, including, but not limited to, RAM, ROM, hard drives, flash drives, or other memory devices. Memory 114 stores information accessible by processor(s) 112, including instructions that can be executed by processor(s) 112. The instructions can be any set of instructions that when executed by the processor(s) 112, cause the processor(s) 112 to provide desired functionality. For instance, the instructions can be software instructions rendered in a computer-readable form. When software is used, any suitable programming, scripting, or other type of language or combinations of languages may be used to implement the teachings contained herein. Alternatively, the instructions can be implemented by hard-wired logic or other circuitry, including, but not limited to application-specific circuits.

Memory 114 can also include data that may be retrieved, manipulated, or stored by processor(s) 114. For instance, memory 114 can store information associated with the user of the mobile device, such as preferred routing information, geographic information associated with the user, and calendar information associated with the user. As will be discussed in further detail below, such information can be used in the generation of a route to tailor routing information to a specific individual.

The computing device 110 can include a network interface 116 for accessing information over a network 120. The network 120 can include a combination of networks, such as cellular network, WiFi network, LAN, WAN, the Internet, and/or other suitable network and can include any number of wired or wireless communication links. For instance, computing device 110 could communicate through a cellular network using a WAP standard or other appropriate communication protocol. The cellular network could in turn communicate with the Internet, either directly or through another network.

Computing device 110 can also have a location monitoring component 118 for generating location information for the computing device 110. For instance, the computing device 110 can include a GPS module or can include a component for determining the position of the computing device 110 based on signals received from one or more cell phone towers. The computing device 110 can communicate location information over network 120 for use in providing routing information to the user.

Computing device 110 can communicate with another computing device 130 over network 120. Computing device 130 can be a server, such as a web server, that provides information to a plurality of client computing devices, such as computing devices 110 and 160 over network 120. Computing device 130 receives requests from computing device 110 and locates information to return to computing devices 110 responsive to the request. The computing device 130 can take any applicable form, and can, for instance, include a system that provides search services, such as the services provided by Google Inc.

Similar to computing device 110, computing device 130 includes a processor(s) 132 and a memory 134. Memory 134 can include instructions 136 for receiving routing request information from a client device and for generating a route for presentation to the client device based on the routing request information. Memory 134 can also include or be coupled to various databases containing information for presentation to a user and for generating route information. For instance, memory 134 can include a map database 138, travel parameter database 140, user information database 142, and wireless coverage database 144. As will be discussed below, processor(s) 132 can be configured to execute instructions stored in memory 134 to provide route information to a user based at least in part on information stored in map database 138, travel parameter database 140, user information database 142, and/or wireless coverage database 144.

Map database 138 stores map-related information, at least a portion of which can be transmitted to a client device, such as computing device 110. For instance, map database 138 can store map tiles, where each tile is an image of a particular geographic area. Depending on the resolution (e.g. whether the map is zoomed in or out), a single tile may cover an entire state in relatively little detail or just a few streets in high detail.

The map database 138 can also include points of interest. A point of interest can be any item that is interesting to one or more users and that is associated with a geographical location. For instance, a point of interest can include a landmark, stadium, or building. A point of interest can be added to the map database 138 by professional map providers, individual users, or other entities.

The map database 138 can also store street information. In addition to street images in the tiles, the street information can include the location of a street relative to a geographic area or other streets. For instance, it can store information indicating whether a traveler can access one street directly from another street. Street information can further include street names where available, and potentially other information, such as distance between intersections and speed limits. All or some of the foregoing can be used by processor(s) 132 to compute a route between an origin and destination.

The travel parameter database 140 stores various travel parameters that can be used in the determination of a route from one location to another. For instance, travel parameter database 140 can include information associated with estimated trip time while traversing a particular street or path between locations. Travel parameter database 140 can include information associated with average speed over a particular street or traversable path. Travel parameter database 140 can further include traffic information that can be used in the computation of a route. For instance, travel parameter database 140 can include real-time traffic conditions obtained from, for instance, a traffic service. The travel parameter database 140 can include information obtained from public agencies, roadway monitors, traffic cameras, and the like. The information can include real-time information concerning the speed of traffic flow at particular points in a transportation system.

User information database 142 can include information optionally provided by a particular user of the route planning system 100. For instance, a user of computing device 110 can indicate that the user wishes to share information with computing device 130, such as preferred route information, current location information, historical routes taken by the user, geographic area information, calendar information or other information. This information can be used by processor(s) 132 in determining a particular route. User information database 142 can at least temporarily store user information for use by processor(s) 132 in determining a route.

Computing device 130 further includes or is coupled to a wireless coverage database 144. Wireless coverage database 144 stores wireless coverage information used in determining a route. Wireless coverage information can include, for instance, the estimated travel time along a particular traversable path without wireless coverage. Other wireless coverage information can include signal strength information, locations of dead zones, number of dropped calls/coverage associated with a particular area, user feedback concerning wireless access, or other suitable information indicative of wireless access for a geographic area.

Wireless coverage information can be categorized by particular wireless coverage provider such that wireless coverage information associated with different providers can be independently used in the determination of route information. For instance, the computing device 130 can use wireless coverage information associated with a first wireless provider in a generating a suggested route for a first user and a can use wireless coverage information associated with a second wireless provider in generating a suggested route for a second user.

Wireless coverage database 144 can obtain wireless coverage information from a plurality of sources. For instance, wireless coverage database 144 can be coupled to or can access a wireless provider database 146 associated with a particular wireless provider, such that wireless coverage database is periodically updated with wireless coverage data from the wireless provider database 146. The wireless coverage database 144 can include a network service map received from wireless provider database 146 that is used to estimate wireless signal quality in a particular geographic area.

Alternatively, or in addition to receiving information from a wireless provider database 146, the wireless coverage database 144 can store physically collected wireless coverage information. For instance, wireless coverage data or information can be physically collected simultaneously with the collection of panoramic imagery or other mapping imagery or data to be used as part of a mapping service, such as the Street View mapping service provided by Google Inc. The collected wireless signal strength or time without coverage along various traversable paths can be stored in the wireless coverage database 144 for use in providing route information to a user.

In addition, wireless coverage database 144 can include wireless coverage data provided from a user's mobile device, such as computing device 110. The user's mobile device can log historical data of wireless coverage information, such as signal strength information, and associate this data with geographic regions using the mobile device's location monitoring component 118. At the user's option, the wireless coverage data stored on the user's mobile device can be provided to wireless coverage database 144 through network 120 for use in determining route information. If wireless coverage information data is collected from a user's mobile device, it can be anonymized or otherwise handled so that a particular user's location history cannot be inferred from the data.

According to a particular embodiment of the present disclosure, the wireless coverage database 144 can include wireless coverage data collected from a plurality of mobile devices. In this particular implementation, a plurality of mobile devices can optionally share wireless coverage information with the computing device 130, for instance, by transmitting wireless coverage information over the network. The wireless coverage information can be collected in near real time to provide up-to-date wireless coverage routing information to users.

For instance, the wireless coverage database 144 could continuously monitor signals received from a plurality of mobile devices along multiple travel routes to assess the strength of wireless coverage along the particular route. If a particular cellular tower located along a route has malfunctioned, the computing device 130 could detect a failure to receive wireless coverage data in the geographic area associated with the cellular tower. The computing device 130 can provide routing information based on this information to route users around the geographic area with the malfunctioning cellular tower.

Computing device 130 can also communicate with external servers to acquire other needed data. External servers could include, for example, mapping servers that provide updated information about roadway locations and other mapping data. In addition, computing device 130 can communicate with other databases as needed. These databases can be connected to computing device 130 by a high bandwidth LAN or WAN, or could also be connected to computing device 130 through network 120. The databases, including map database 138, travel parameter database 140, user information database 142, and wireless coverage database 144, can be split up so that they are located in multiple locales.

Within computing device 130, processor(s) 132 can compute a suggested route in response to requests from a user device, such as computing device 110. The processor(s) 132 can determine a suggested route for a travel objective by accessing a graph model 150 for the geographic area associated with the travel objective. Details of an exemplary graph model 150 will be discussed with reference to FIGS. 4 and 5.

Generally, the graph model 150 can include a plurality of nodes associated with intersections and points of interest in the geographic area. The graph model 150 can also include a plurality of edges interconnecting the plurality of nodes. The edges are associated with traversable paths between the plurality of nodes in the graph model 150. Each of the plurality of edges can be assigned a weighting factor to be used in the calculation of a suggested route between nodes in the graph model 150. For instance, a shortest path algorithm can be used to determine a path between nodes in the graph model 150 that reduces the sum of the weighting factors assigned to the edges between the nodes.

The graph model 150 can be stored at computing device 130 and periodically updated based on information from map database 138, travel parameter database 140, user information database 142, and wireless coverage database 144. As will be discussed in detail below, the graph model 150 can be adjusted based on wireless coverage data to provide a suggested route that increases wireless access for a traveler along the suggested route.

Once a suggested route has been determined, computing device 130 can provide the suggested rote information to computing device 110 over network. The suggested route information can be provided to computing device 110 in any suitable format. For mobile devices, the information can be transmitted as an HTML document or other fully-formatted document that will not require much processing by the mobile device. The information can include HTML code, XML messages, WAP code, Java applets, xhtml, plain text, voiceXML, VoxML, VXML, or other suitable format, that causes the device to display the suggested route information.

FIG. 2 depicts an exemplary mobile device 110 displaying suggested route information according to an exemplary embodiment of the present disclosure. As shown, exemplary mobile device 110 includes an interface 200 that depicts map information, including a plurality of streets between an origin 210 and a destination 220. A suggested route 230 is highlighted along the plurality of streets. In addition, the interface 200 includes a location indicator 240 that indicates the current location of the mobile device 110 along the suggested travel route 230.

The suggested route information can include information in addition to a simple map with routes rendered on it. For instance, text directions associated with the suggested route could be provided to the user. Locations on the map could be provided with hyper-linked icons whose selection will cause information to be broadcast to the user. Other information could include annotations associated with points of interest along the travel route. The annotations displayed to the user could be selected based on personal preferences optionally shared by the user with the route determination system.

Optionally, the interface 200 can display areas of low wireless coverage 250 on the mobile device. The areas of low wireless coverage can be determined from information stored in wireless coverage database 144 and provided to computing device 110 for display on interface 200. The areas of low wireless coverage 250 can be rendered as a highlighted portion along travel routes in the map displayed on interface 200. As shown in FIG. 2, the route 230 avoids the areas of low wireless coverage 250, providing a travel route that increases wireless access for the traveler.

Figure 3:
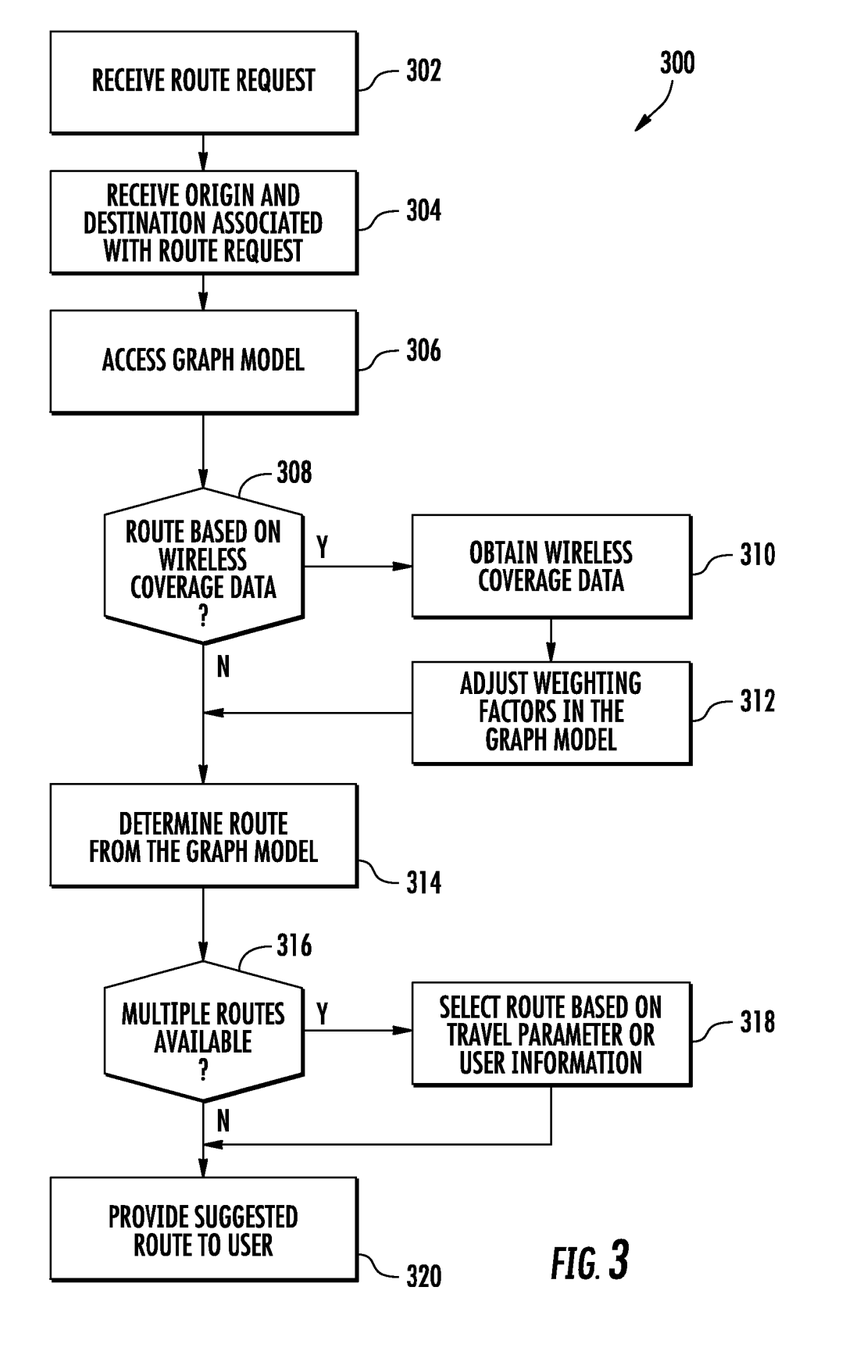
FIG. 3 depicts a flow diagram of an exemplary method according to an exemplary embodiment of the present disclosure.

FIG. 3 depicts a flow diagram of an exemplary method 300 for providing suggested route information to a user according to an exemplary embodiment of the present disclosure. The method shown in FIG. 3 will be discussed with reference to the system illustrated in FIG. 1. However, those of ordinary skill in the art, using the disclosures provided herein, will appreciate the methods discussed herein can be executed by any computing device or combination of computing devices. For instance, the methodology discussed herein could be performed entirely on a computing device associated with the user, such as a user's mobile device.

Referring back to FIG. 3, a request for route information associated with a particular travel objective is received (302). The request can be generated in any appropriate manner. For instance, a user can access an application on mobile device 110 and input a request for route information. The mobile device 110 can then transmit the request for route information to computing device 130. Alternatively, the mobile device 110 can automatically request routing information from computing device 130 on a periodic basis. For instance, based on calendar information associated with a user of computing device 110, computing device 110 can automatically transmit a request for routing information based on information stored in the user's calendar indicating that the user intends to travel at a particular location.

At (304), origin and destination information associated with the route request for the particular travel objective is received. The origin and destination information can be received simultaneously with or separate from the request for routing information. The origin information can be manually entered by a user on mobile device 110 or can be based on a user's current location determined by, for instance, the location monitoring component 118. The destination information can be manually entered by the user or can be automatically retrieved based on the information associated with the user, such as the user's calendar information. For instance, the destination information can be based on an intended location for a meeting scheduled in a user's calendar.

Figure 4:
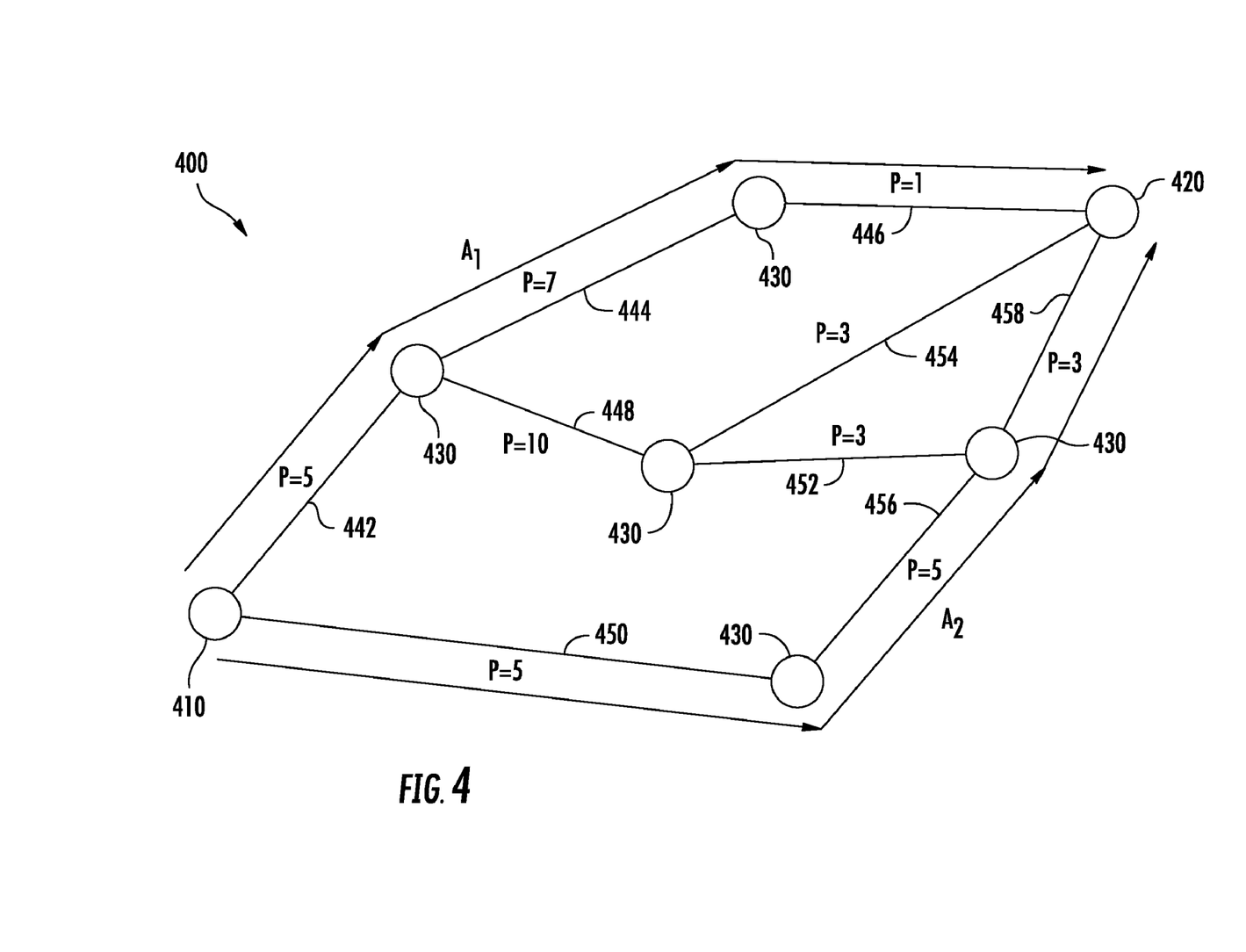
FIG. 4 depicts an exemplary graph model used to determine route information according to an exemplary embodiment of the present disclosure.

Once the origin and destination information are received, a graph model associated with the geographic area proximate the travel objective (306) is accessed. The graph model is used in the determination of a suggested route from the origin and the destination. An exemplary graph model 400 is depicted in FIG. 4. As shown, graph model 400 includes a plurality of nodes, including a starting node 410 and a destination node 420. The starting node 410 is associated with the origin information received as part of the route request. The destination node 420 is associated with destination information received as part of the route request. The graph model 400 includes a plurality of additional nodes 430 representative of intersections and points of interest in the geographic area proximate the travel objective.

The graph model 400 further includes a plurality of edges 442, 444, 446, 448, 450, 452, 454, 456, and 458. Each of the plurality of edges represents a traversable path between nodes in the graph model. The plurality of nodes and edges in the graph model can be based on information stored in various databases, such as map database 138. The graph model 400 can be generated before or after a request for routing information is received.

In the graph model 400, each of the plurality of edges is assigned a weighting factor P. The weighting factor P can be based on any of a number of parameters, including distance, estimated travel time, average speed, traffic conditions, or any other suitable parameter. The weighting factor can also be based at least in part on information associated with the user. For instance, the weighting factor can take into account preferred or favorite route information or historical route information optionally provided by the user for use in the graph model.

Table 1 below provides exemplary weighting factor information for edges 442, 444, 446, 448, 450, 452, 454, 456, and 458

TABLE 1

| Edge | Weighting Factor |
|---|---|
| 442 | 5 |
| 444 | 5 |
| 446 | 1 |
| 448 | 10 |
| 450 | 5 |
| 452 | 3 |
| 454 | 3 |
| 456 | 5 |
| 458 | 3 |

A route can be determined from the graph model 400 based on the weighting factors assigned to the edges in the graph model. For instance, a shortest path algorithm can be used to determine a path between the starting node 410 and the destination node 420 that reduces the sum of weighting factors assigned to the edges in the path. In the example graph model depicted in FIG. 4, a shortest path algorithm can determine that path A1 along edges 442, 444, and 446 or path A2 along edges 450, 456, and 458 provide the lowest sum of weighting factors. If a route that increases wireless coverage has not been requested, a route can be suggested to the user from the graph model based on the identified paths in the graph model as shown at (314) of FIG. 3. For instance, the route associated with path A1 or path A2 in graph model 400 can be suggested to the user for assistance in navigation.

While the present disclosure is discussed with reference to a shortest path algorithm to determine a suggest route between nodes, those of ordinary skill in the art, using the disclosure provided herein, should understand that any suitable process or algorithm for determining a path between nodes in the graph model based on weighting parameters assigned to the edges in the graph model can be used without deviating from the scope of the present disclosure. For instance, Dijkstra's algorithm, the Bellman-Ford algorithm, the A* search algorithm, or a combination of these algorithms and other algorithms can be used to determine a path between nodes in the graph model.

Referring back to FIG. 3 at (308), the method determines whether to provide a route based on wireless coverage data. The determination of whether to provide routing information based on wireless coverage data can depend on a variety of factors. For instance, a user could request routing information based on wireless access as part of the route request by adjusting a setting associated with an interface for requesting routing information. Alternatively, user information optionally provided by the user can indicate that a user always prefers routing information that increases wireless access. For instance, the user information can specify that the user prefers wireless access routing at certain times of the day, such as during business hours.

If routing information that increases wireless access is desired, wireless coverage data for the geographic area associated with the travel objective is obtained at (310). The wireless coverage data can be obtained, for instance, from a wireless coverage database, such as wireless coverage database 144. The wireless coverage data could include estimated travel time along a particular traversable path without wireless coverage. Other wireless coverage data can include strength of signal information, locations of dead zones, number of dropped calls/coverage associated with a particular area, user feedback concerning wireless access, or other suitable information indicative of wireless access for a geographic area.

Once the wireless coverage data has been obtained, the weighting factors assigned to the plurality of edges in the graph model are adjusted based at least in part on the wireless coverage data (312). For instance, if the wireless coverage data indicates that wireless access along a particular edge is low, the weighting factor associated with that particular edge can be adjusted to decrease the probability of that particular edge being selected as part of a travel route generated from the graph model. If the wireless coverage data indicates that wireless access along a particular edge is relatively good, the weighing factor associated with that particular edge can be adjusted to increase the probability of that particular edge being selected as part of a travel route generated from the graph model.

Figure 5:
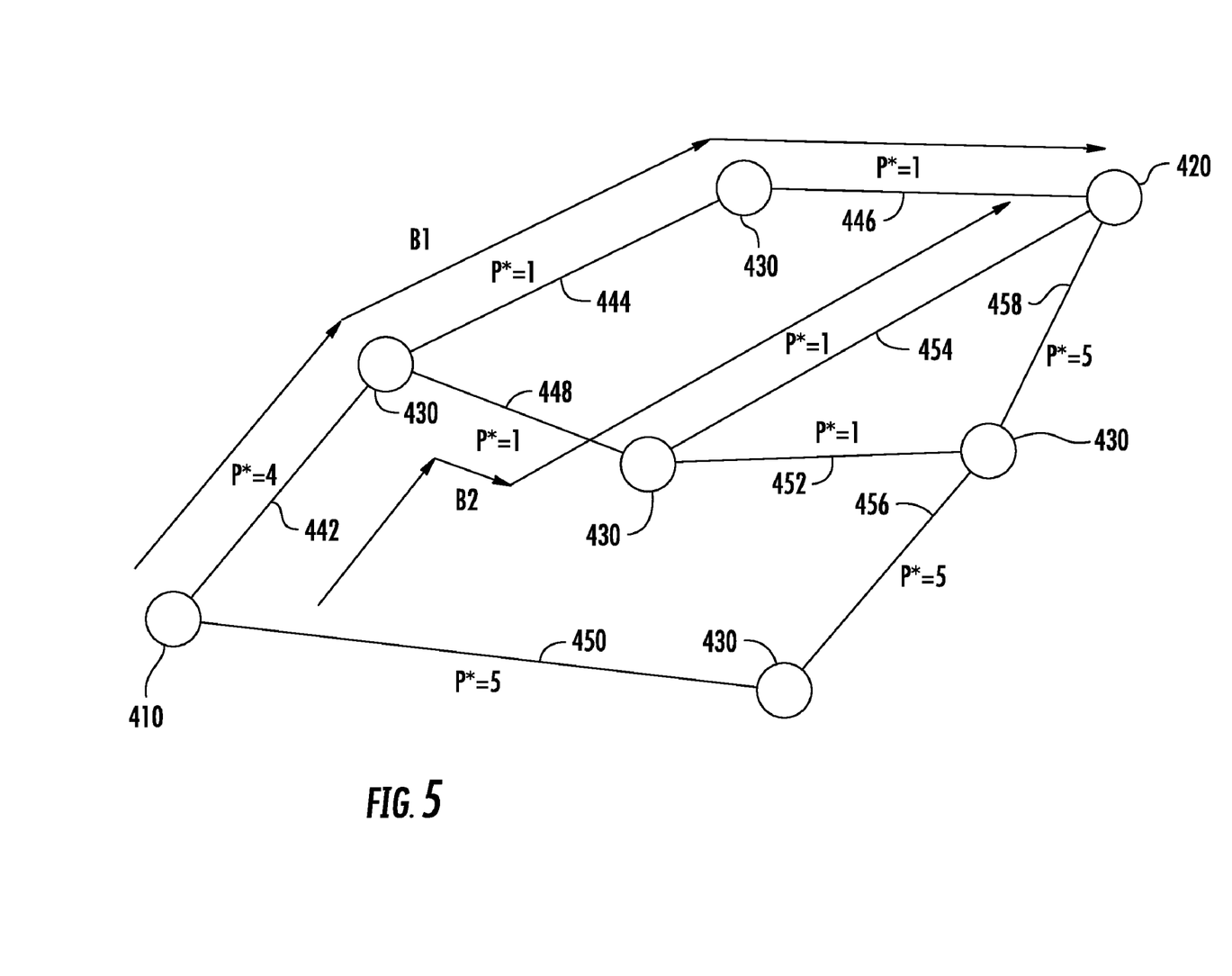
FIG. 5 depicts an exemplary graph model used to determine route information according to an exemplary embodiment of the present disclosure.

FIG. 5 depicts exemplary graph model 400 with weighting factors assigned or adjusted based on wireless coverage data. Table 2 below provides exemplary adjusted weighting factor information for edges 442, 444, 446, 448, 450, 452, 454, 456, and 458.

TABLE 2

| Edge | Weighting Factor |
|---|---|
| 442 | 4 |
| 444 | 8 |
| 446 | 3 |
| 448 | 1 |
| 450 | 5 |
| 452 | 1 |
| 454 | 1 |
| 456 | 5 |
| 458 | 5 |

As indicated by the adjusted weighting factors P* assigned to the edges, the wireless access associated with edges 448, 452, and 454 is relatively good (i.e. assigned relatively low weighting factor values) compared to wireless access associated with edges 444, 450, 456, and 458 (i.e. assigned relatively high weighting factor values). In the example graph model 400 depicted in FIG. 5, a shortest path algorithm could be used to determine that path B1 along edges 442, 444, and 446 or path B2 along edges 442, 448 and 454 provide the lowest sum of weighting factors. The routes associated with paths B1 and B2 provide increased wireless access for the traveler when compared to other possible routes based solely on travel parameter information or user information.

The routing information can be determined based on wireless coverage information and other parameters, such as travel parameters or user information. For instance, as shown in FIG. 3, if multiple routes are determined from the graph model that provide increased wireless access (316), one of the plurality of routes can be selected based on travel parameter information or user information as shown at (318). For instance, the method can select the route that provides the shortest distance the quickest travel time, or reduced traffic. Alternatively, the route can be selected based on information associated with the user. For instance, the route can be selected based on preferred or disfavored route information or historical route information associated with the user. Once a route has been selected, the route can be provided to the user as shown at (320) to assist the user in navigation.

The routing information can also be determined based on wireless coverage information and at least one additional parameter by assigning the weighting factors to the plurality of edges in a graph model based at least in part on wireless coverage data and other additional parameterd, such as travel parameter data. For instance, the weighting factors assigned to the plurality of edges in the graph model can be based on a function of both wireless coverage data and at least one other travel parameter. An exemplary function for determining the weighting factor is provided below:

$$P(x,y)=k_1 A(x)+k_2 B(y)\ldots$$

A(x) represents a function for determining a value to be used in the calculation of weighting factor based on wireless coverage data. B(y) represents a function for determining a value to be used in the calculation of the weighting factor based on an additional parameter, such as travel time, average speed, shortest distance, traffic conditions, preferred routes, or other suitable parameter. $k_1$ and $k_2$ represent constants used to adjust the relative contribution of A(x) and B(y) in the determination of the weighting factor assigned to the edges. While only two parameters are used in the determination of the weighting factor by the exemplary function P(x,y), those of ordinary skill in the art, using the disclosures provided herein, should understand that more or less parameters can be used as desired. By assigning weighting factors to the plurality of edges in the graph model based on multiple parameters, the subject matter of the present disclosure can provide a route planning tool that not only takes into account wireless coverage, but also other travel parameters, such as shortest path, quickest travel time, preferred routes, and reduced traffic.

Figure 6:
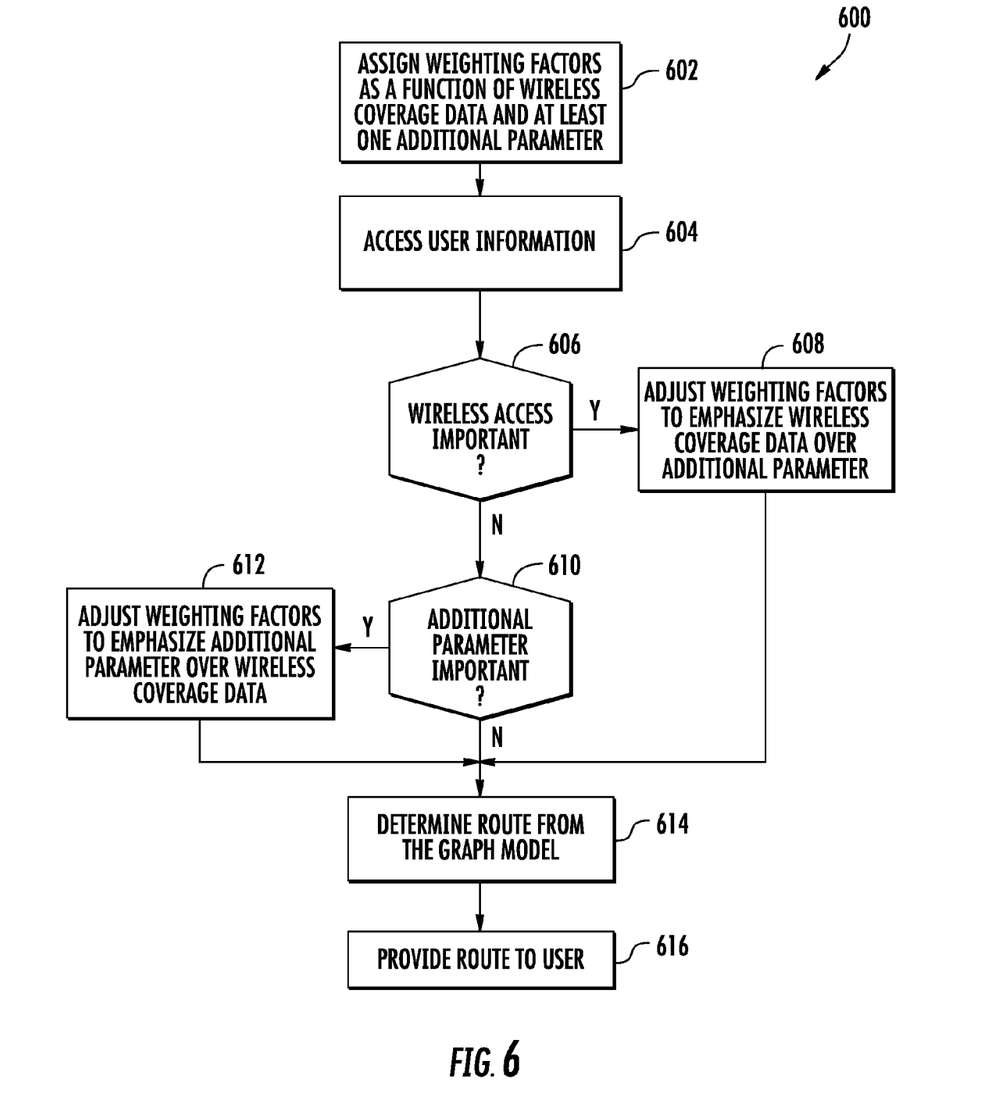
FIG. 6 depicts a flow diagram of an exemplary method according to an exemplary embodiment of the present disclosure.

FIG. 6 depicts an exemplary method 600 for adjusting the weighting factors assigned to a plurality of edges based on user information. As shown at (602) the method includes assigning weighting factors to edges in a graph model as a function of multiple parameters, such as wireless coverage data and at least one additional parameter, such as distant, travel time, preferred routes, traffic conditions, etc. The method then accesses user information (604) for use in determining a suggested route. The user information can be accessed from a user information database or from a computing device associated with a user, such as a user's mobile device.

Based on the user information, the method determines whether wireless access or the additional parameter is more important to the user in receiving suggested route information. For instance, the method can access the user's calendar information to determine that the user has a scheduled telephone call during travel. In this example, the method could determine that wireless access during travel is more important than parameters such as travel speed, distance, traffic conditions, etc. As another example, the method could access the user's calendar information to determine that the user has a scheduled meeting at an intended location scheduled for a particular time. In this example, the method could determine that travel parameters such as shortest distance, travel speed, or traffic conditions are more important than wireless access during travel.

Based on the user information, the method can adjust the function for determining the weighting factors assigned to the plurality of edges to emphasize wireless coverage information or other travel parameters as desired. For instance, with reference to the exemplary function P(x,y), the method can include adjusting the constants $k_1$ and/or $k_2$ to emphasize wireless coverage access or travel parameter information in the determination of a suggested route from origin to destination.

As shown in FIG. 6, the method determines from the user information whether wireless access is important at (606). If so, the method adjusts the weighting factors in a graph model to emphasize wireless coverage data over additional parameters used in the calculation of the weighting factors (608). If the method determines that the additional parameters are more important (610), the weighting factors in the graph model are adjusted to emphasize the additional parameters over wireless coverage data (612).

Once the weighting factors in the graph model have been properly adjusted, a route from the graph model is determined (614). For instance, a route can be determined from the graph model using any of the methods or techniques discussed herein. Once the route has been determined, the route can be provided to the user (616) for assistance in navigation. In this manner, the subject matter of the present disclosure can provide an enhanced route planning tool that can be used to tailor route information to specific users while increasing wireless access for the user during travel.

Figure 7:
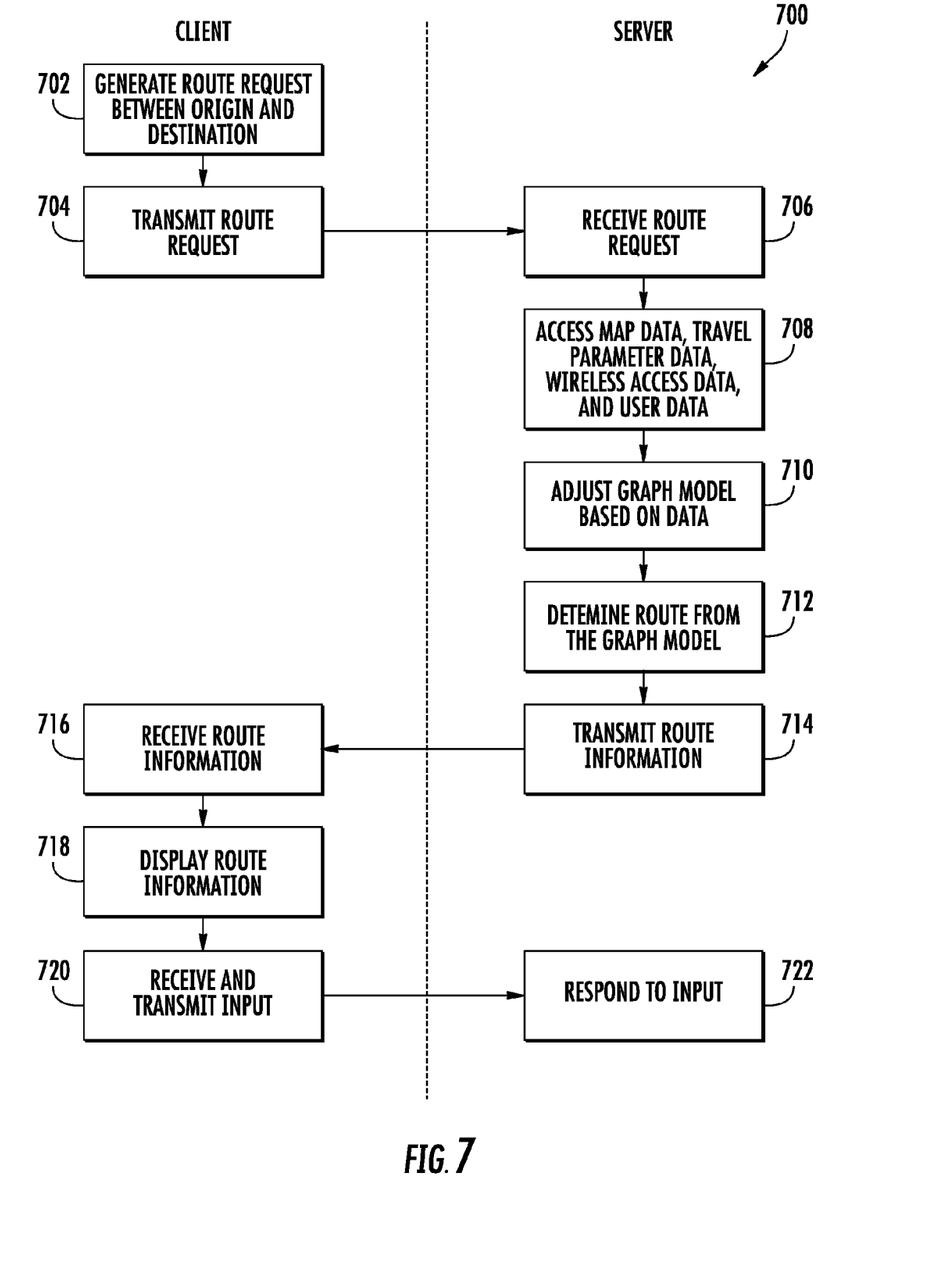
FIG. 7 depicts a server-client flow diagram according to an exemplary embodiment of the present disclosure.

FIG. 7 depicts a client-server flow diagram for an exemplary method for providing route information to a user. While the present disclosure is discussed with reference to a client-server relationship, those of ordinary skill in the art, using the disclosures provided herein, should understand that the subject matter of the present disclosure can be carried out on a single computing device, such as on a mobile device associated with a user.

When a user desires to have a suggested route generated, the user can have a computing device, such as a mobile device, generate a request (702) in any suitable manner and the computing device can transmit the request to a server (704) over a network. The server can receive the request (706) and use it to compute a suggested route. In computing the suggested route, the server can access data (708), such as map data, travel parameter data, wireless coverage data, and user data, and adjust a graph model according to any of the techniques discussed herein based on the data (710).

The server can then determine a suggested route (712) from the graph model and transmit the route information (714) to the computing device associated with the user. The route information can be transferred, for instance, as a map with the routes rendered on the map, such as through an HTML document. Additional route information could also be transferred, such as information about points of interest or near the route or advertising information, including hyperlinks to allow access to even more information. The computing device associated with the user then displays the route information to the user in any suitable form (718).

A user can provide additional input (720) after the route information is received. For instance, the user can select a hyperlink associated with the route information. The server can then respond to the input (722), for instance, by transmitting information responsive to the request, such as by providing additional web content.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of providing route information, comprising:
    receiving an origin and a destination for a travel objective;
    accessing a graph model associated with a geographic region proximate the travel objective; the graph model comprising a plurality of edges associated with traversable paths between the origin and the destination;
    obtaining wireless coverage data associated with the geographic region;
    adjusting the graph model based at least in part on the wireless coverage data, the wireless coverage data comprising estimated time spent without wireless coverage while traversing at least one of the plurality of edges;
    determining a route between the origin and destination from the adjusted graph model to provide increased wireless coverage during the travel objective; and
    providing the route for presentation to a user.

2. The computer-implemented method of claim 1, wherein adjusting the graph model comprises adjusting a weighting factor assigned to at least one of the plurality of edges in the graph model.

3. The computer-implemented method of claim 2, wherein the route between the origin and destination is determined from the graph model based at least in part on the weighting factor assigned to at least one of the plurality of edges in the graph model.

4. The computer-implemented method of claim 2, wherein the weighting factor assigned to at least one of the plurality of edges of the graph model is adjusted based at least in part on the wireless coverage data and at least one travel parameter associated with the edge.

5. The computer-implemented method of claim 4, wherein the at least one travel parameter comprises estimated travel time, distance, average speed, preferred routing information, or traffic information.

6. The computer-implemented method of claim 4, wherein the method comprises adjusting the weighting factor assigned to at least one of the plurality of edges based at least in part on information associated with the user.

7. The computer-implemented method of claim 6, wherein the method comprises adjusting the weighting factor to emphasize the wireless coverage data over the at least one travel parameter if the information associated with the user indicates the user needs wireless access during travel.

8. The computer-implement method of claim 6, wherein the information associated with the user comprises calendar information associated with the user.

9. The computer-implemented method of claim 8, wherein the method comprises emphasizing wireless coverage data over the at least one travel parameter in the adjustment of the weighting factor if the calendar information indicates the user needs wireless access during travel.

10. The computer-implemented method of claim 8, wherein the method comprises emphasizing the travel parameter over the wireless coverage data in the adjustment of the weighting factor if the calendar information indicates the user needs to arrive at the destination by a particular time.

11. The computer-implemented method of claim 1, wherein the wireless coverage data is obtained from a wireless network service provider.

12. The computer-implemented method of claim 1, wherein the wireless coverage data is obtained from a database of physically collected wireless coverage data.

13. The computer-implemented method of claim 1, wherein the wireless coverage data is obtained in near real time from a plurality of mobile devices.

14. The computer-implemented method of claim 1, wherein generating a route between the origin and destination from the adjusted graph model comprises:
    determining a plurality of routes from the origin to the destination from the adjusted graph model; and
    selecting one of the plurality of routes for presentation to the user based at least in part on a parameter associated with the route, the parameter being selected from the group consisting of estimated travel time, shortest distance, average speed, preferred routing information, or traffic information.

15. The computer-implemented method of claim 1, wherein the method comprises displaying information associated with the wireless coverage data to the user.

16. A system comprising a processing device and a network interface, the processing device configured to:
    receive a request identifying an origin and a destination for a travel objective;
    receive wireless coverage data associated with a geographic region associated with the travel objective;
    generate a route from the origin and destination, the route being generated at least in part from a graph model having a plurality of edges representing traversable paths between the origin and destination, each of the plurality of edges being assigned a weighting factor determined based at least in part on the wireless coverage data and information associated with a user; and
    provide, via the network interface, the route to another processing device.

17. The system of claim 16, wherein each of the plurality of edges is assigned a weighting factor determined based at least in part on at least one additional travel parameter associated with the edge.

18. The system of claim 17, wherein the at least one additional travel parameter comprises estimated travel time, distance, preferred routing information or traffic information.

19. The system of claim 17, wherein the processor is configured to adjust the weighting factor to emphasize the wireless coverage data over the at least one travel parameter if the information associated with the user indicates the user needs wireless access during travel.

20. The system of claim 16, wherein the information associated with the user comprises calendar information associated with the user.

21. A computing device for providing route information to a user, comprising:
a user interface configured to receive an origin and a destination for a travel objective from a user;
a network interface configured to access a remote computing device over a network;
a display device configured to display route information to the user; and
a processing device configured to:
provide the origin and destination via the network interface to the remote computing device;
receive from the remote computing device a route generated, the route being generated at least in part from a graph model having a plurality of edges representing traversable paths between the origin and destination, each of the plurality of edges being assigned a weighting factor determined based at least in part on wireless coverage data and information associated with the user; and
display, via the display device, the route to the user.

22. The computing device of claim 21 wherein each of the plurality of edges is assigned a weighting factor determined based at least in part on at least one additional travel parameter associated with the edge.

23. The computing device of claim 21, wherein the information associated with the user comprises calendar information associated with the user.

24. A computer-readable medium having computer-readable instructions for execution by a processor, causing the processor to perform operations, the operations comprising:
receiving an origin and a destination for a travel objective;
accessing a graph model associated with a geographic region proximate the travel objective, the graph model comprising a plurality of edges representing traversable paths between the origin and the destination;
obtaining wireless coverage data associated with the geographic region;
adjusting a weighting factor assigned to at least one of the plurality edges of the graph model based at least in part on the wireless coverage data, the wireless coverage data comprising estimated time spent without wireless coverage while traversing a particular edge;
generating a route between the origin and destination from the graph model based at least in part on the adjusted weighting factors assigned to the plurality of edges; and
providing the route for presentation to a user.

25. The computer-readable medium of claim 24, wherein the weighting factor assigned to at least one of the plurality of edges of the graph model is adjusted based at least in part on the wireless coverage data and at least one travel parameter associated with the edge.

26. The computer-readable medium of claim 24, wherein the at least one travel parameter comprises estimated travel time, distance, average speed, preferred routing information or traffic information.

27. The computer-readable medium of claim 24, wherein the operations comprise adjusting the weighting factor assigned to at least one of the plurality of edges based at least in part on information associated with the user.

28. The computer-readable medium of claim 27, wherein the operations comprise adjusting the weighting factor to emphasize the wireless coverage data over the at least one travel parameter if the information associated with the user indicated the user needs wireless access during travel.

* * * * *